United States Patent
Balasubramanian et al.

(10) Patent No.: US 12,302,094 B2
(45) Date of Patent: May 13, 2025

(54) TECHNIQUES FOR SIDELINK CONNECTIONLESS GROUPCAST COMMUNICATION USING A SECURITY KEY

(71) Applicant: QUALCOMM Incorporated, San Diego, CA (US)

(72) Inventors: Anantharaman Balasubramanian, San Diego, CA (US); Hong Cheng, Basking Ridge, NJ (US); Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/645,155

(22) Filed: Dec. 20, 2021

(65) Prior Publication Data
US 2023/0199485 A1  Jun. 22, 2023

(51) Int. Cl.
*H04W 12/0431* (2021.01)
*H04W 12/041* (2021.01)
*H04W 72/30* (2023.01)
*H04W 72/40* (2023.01)
*H04W 64/00* (2009.01)

(52) U.S. Cl.
CPC ..... *H04W 12/0431* (2021.01); *H04W 12/041* (2021.01); *H04W 72/30* (2023.01); *H04W 72/40* (2023.01); *H04W 64/00* (2013.01)

(58) Field of Classification Search
CPC ........... H04W 12/0431; H04W 12/041; H04W 72/40; H04W 64/00; H04W 4/021; H04W 4/029; H04W 92/18; H04W 76/14; H04L 63/065
See application file for complete search history.

(56) References Cited

U.S. PATENT DOCUMENTS

| | | | |
|---|---|---|---|
| 9,942,938 B2 * | 4/2018 | Pragada ................ | H04W 76/22 |
| 2016/0134418 A1 * | 5/2016 | Liu .................... | H04W 12/0431 713/171 |
| 2016/0381543 A1 * | 12/2016 | Zhang .................... | H04W 4/80 455/411 |
| 2020/0059767 A1 * | 2/2020 | Woo ...................... | H04W 4/027 |
| 2021/0051005 A1 | 2/2021 | Kunz et al. | |

FOREIGN PATENT DOCUMENTS

WO  WO-2020155138 A1  8/2020
WO  WO-2021165056 A1  8/2021

OTHER PUBLICATIONS

International Search Report and Written Opinion—PCT/US2022/080042—ISA/EPO—Mar. 14, 2023.

\* cited by examiner

*Primary Examiner* — Huan V Doan
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit, to a node, a request for a security key for sidelink connectionless groupcast communication that is performed without a radio resource control connection between UEs. The request may indicate a distance from the UE for using the security key. The UE may receive, from the node, information that indicates the security key. Numerous other aspects are described.

30 Claims, 10 Drawing Sheets

TECHNIQUES FOR SIDELINK CONNECTIONLESS GROUPCAST COMMUNICATION USING A SECURITY KEY

FIELD OF THE DISCLOSURE

Aspects of the present disclosure generally relate to wireless communication and to techniques and apparatuses for sidelink connectionless groupcast communication using a security key.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, to a node, a request for a security key for sidelink connectionless groupcast communication that is performed without a radio resource control (RRC) connection between UEs, the request indicating a distance from the UE for using the security key. The method may include receiving, from the node, information that indicates the security key.

Some aspects described herein relate to a method of wireless communication performed by a node. The method may include receiving, from a UE, a request for a security key for sidelink connectionless groupcast communication that is performed without an RRC connection between UEs, the request indicating a distance from the UE for using the security key. The method may include transmitting, to the UE and to at least one different UE that is within the distance of the UE, information that indicates the security key.

Some aspects described herein relate to a method of wireless communication performed by a UE. The method may include receiving, from a node, information that indicates a security key for sidelink connectionless groupcast communication that is performed without an RRC connection between UEs. The method may include receiving, from a different UE, a communication for sidelink connectionless groupcast using the security key.

Some aspects described herein relate to an apparatus for wireless communication at a UE. The apparatus may include a memory and one or more processors coupled to the memory. The one or more processors may be configured to transmit, to a node, a request for a security key for sidelink connectionless groupcast communication that is performed without an RRC connection between UEs, the request indicating a distance from the UE for using the security key. The one or more processors may be configured to receive, from the node, information that indicates the security key.

Some aspects described herein relate to an apparatus for wireless communication at a node. The apparatus may include a memory and one or more processors coupled to the memory. The one or more processors may be configured to receive, from a UE, a request for a security key for sidelink connectionless groupcast communication that is performed without an RRC connection between UEs, the request indicating a distance from the UE for using the security key. The one or more processors may be configured to transmit, to the UE and to at least one different UE that is within the distance of the UE, information that indicates the security key.

Some aspects described herein relate to an apparatus for wireless communication at a UE. The apparatus may include a memory and one or more processors coupled to the memory. The one or more processors may be configured to receive, from a node, information that indicates a security key for sidelink connectionless groupcast communication that is performed without an RRC connection between UEs. The one or more processors may be configured to receive, from a different UE, a communication for sidelink connectionless groupcast using the security key.

Some aspects described herein relate to a non-transitory computer-readable medium that stores a set of instructions for wireless communication by a UE. The set of instructions, when executed by one or more processors of the UE, may cause the UE to transmit, to a node, a request for a security key for sidelink connectionless groupcast communication that is performed without an RRC connection between UEs, the request indicating a distance from the UE for using the security key. The set of instructions, when executed by one or more processors of the UE, may cause the UE to receive, from the node, information that indicates the security key.

Some aspects described herein relate to a non-transitory computer-readable medium that stores a set of instructions for wireless communication by a node. The set of instructions, when executed by one or more processors of the node, may cause the node to receive, from a UE, a request for a security key for sidelink connectionless groupcast communication that is performed without an RRC connection between UEs, the request indicating a distance from the UE for using the security key. The set of instructions, when executed by one or more processors of the node, may cause the node to transmit, to the UE and to at least one different UE that is within the distance of the UE, information that indicates the security key.

Some aspects described herein relate to a non-transitory computer-readable medium that stores a set of instructions for wireless communication by a UE. The set of instructions, when executed by one or more processors of the UE, may cause the UE to receive, from a node, information that indicates a security key for sidelink connectionless groupcast communication that is performed without an RRC connection between UEs. The set of instructions, when executed by one or more processors of the UE, may cause the UE to receive, from a different UE, a communication for sidelink connectionless groupcast using the security key.

Some aspects described herein relate to an apparatus for wireless communication. The apparatus may include means for transmitting, to a node, a request for a security key for sidelink connectionless groupcast communication that is performed without an RRC connection between UEs, the request indicating a distance from the apparatus for using the security key. The apparatus may include means for receiving, from the node, information that indicates the security key.

Some aspects described herein relate to an apparatus for wireless communication. The apparatus may include means for receiving, from a UE, a request for a security key for sidelink connectionless groupcast communication that is performed without an RRC connection between UEs, the request indicating a distance from the UE for using the security key. The apparatus may include means for transmitting, to the UE and to at least one different UE that is within the distance of the UE, information that indicates the security key.

Some aspects described herein relate to an apparatus for wireless communication. The apparatus may include means for receiving, from a node, information that indicates a security key for sidelink connectionless groupcast communication that is performed without an RRC connection between UEs. The apparatus may include means for receiving, from a different UE, a communication for sidelink connectionless groupcast using the security key.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
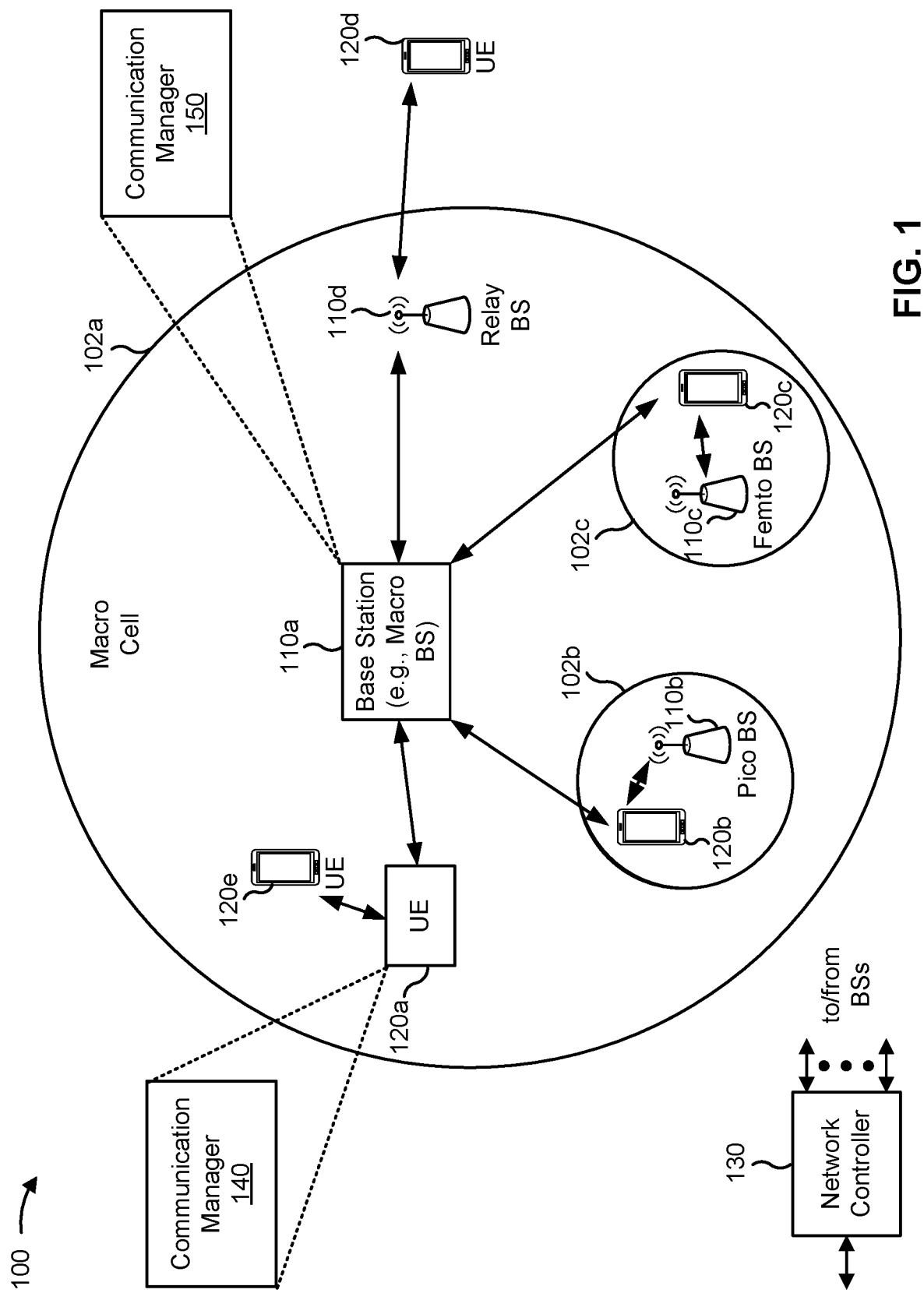
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a node, a request for a security key for sidelink connectionless groupcast communication that is performed without a radio resource control (RRC) connection between UEs, the request indicating a distance from the UE for using the security key; and receive, from the node, information that indicates the security key. As described in more detail elsewhere herein, the communication manager 140 may receive, from a node, information that indicates a security key for sidelink connectionless groupcast communication that is performed without an RRC connection between UEs; and receive, from a different UE, a communication for sidelink connectionless groupcast using the security key. Additionally, or alternatively, the communication manager 140 may perform one or more other operations described herein.

In some aspects, a node (e.g., a base station 110) may include a communication manager 150. As described in more detail elsewhere herein, the communication manager 150 may receive, from a UE, a request for a security key for sidelink connectionless groupcast communication that is performed without an RRC connection between UEs, the request indicating a distance from the UE for using the security key; and transmit, to the UE and to at least one different UE that is within the distance of the UE, information that indicates the security key. Additionally, or alternatively, the communication manager 150 may perform one or more other operations described herein.

As indicated above, FIG. 1 is provided as an example. Other examples may differ from what is described with regard to FIG. 1.

Figure 2:
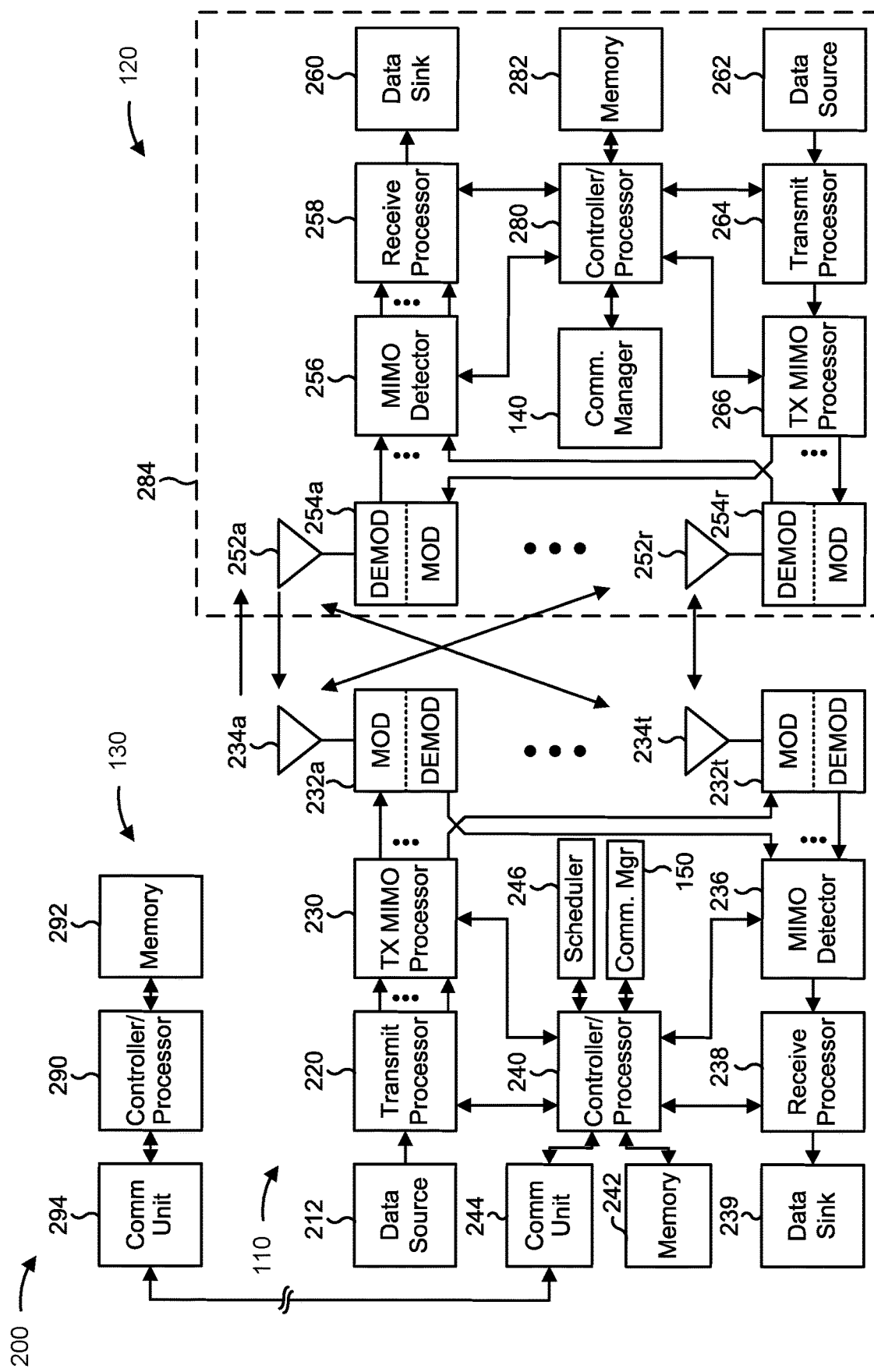
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with sidelink connectionless groupcast communication using a security key, as described in more detail elsewhere herein. In some aspects, the node described herein is the base station 110, is included in the base station 110, or includes one or more components of the base station 110 shown in FIG. 2. In some aspects, the node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for transmitting, to a node, a request for a security key for sidelink connectionless groupcast communication that is performed without an RRC connection between UEs, the request indicating a distance from the UE for using the security key; and/or means for receiving, from the node, information that indicates the security key. In some aspects, the UE includes means for receiving, from a node, information that indicates a security key for sidelink connectionless groupcast communication that is performed without an RRC connection between UEs; and/or means for receiving, from a different UE, a communication for sidelink connectionless groupcast using the security key. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the node includes means for receiving, from a UE, a request for a security key for sidelink connectionless groupcast communication that is performed without an RRC connection between UEs, the request indicating a distance from the UE for using the security key; and/or means for transmitting, to the UE and to at least one different UE that is within the distance of the UE, information that indicates the security key. In some aspects, the means for the node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
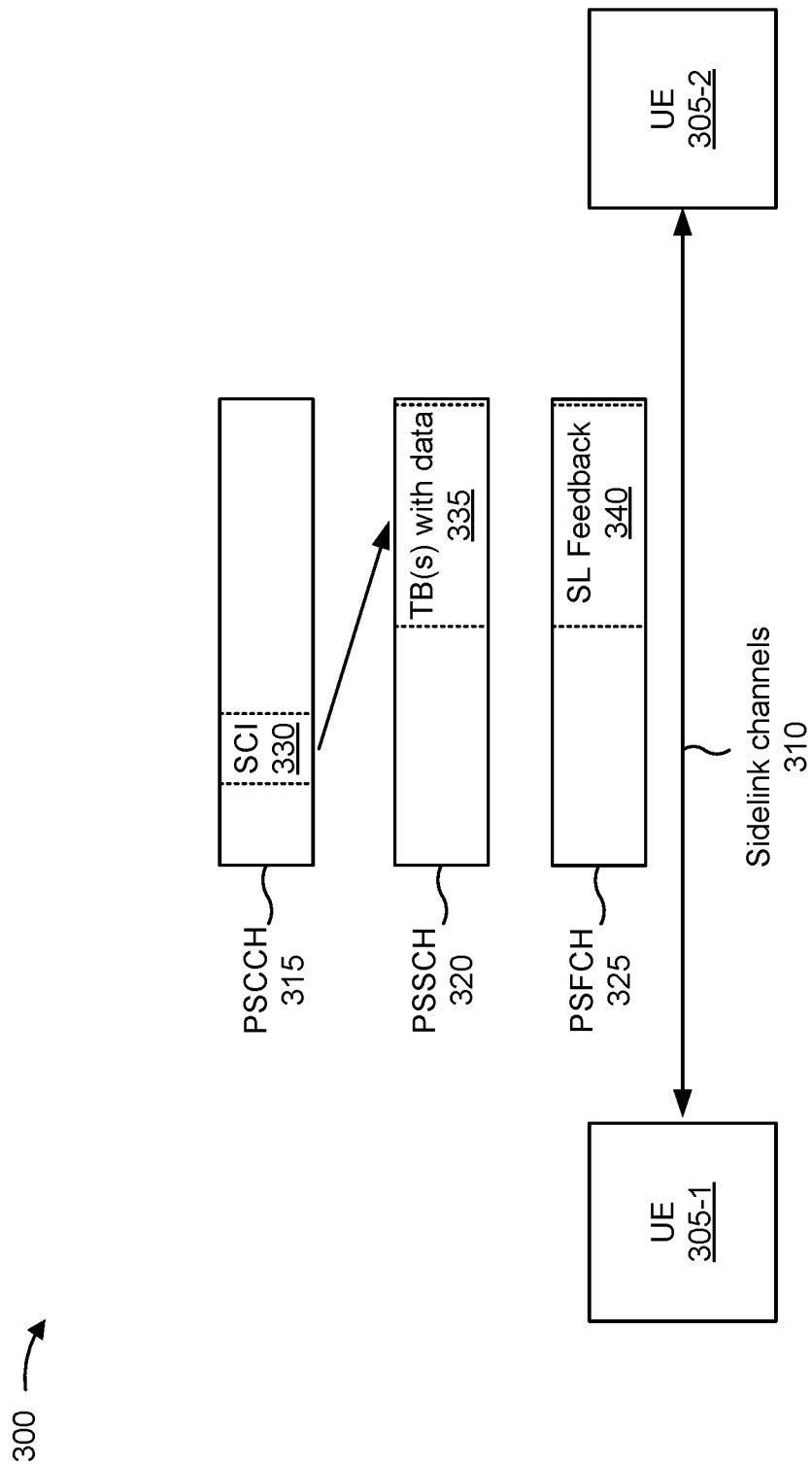
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing. In some examples, a UE 305 may be a roadside unit (RSU) in traffic infrastructure (e.g., on a traffic light, on a light pole of a traffic intersection, or the like).

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320 (e.g., with the TB 335). The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 305 may operate using a sidelink transmission mode (e.g., Mode 1) where resource selection and/or scheduling is performed by a base station 110. For example, the UE 305 may receive a grant (e.g., in downlink control information (DCI) or in an RRC message, such as for configured grants) from the base station 110 for sidelink channel access and/or scheduling. In some examples, a UE 305 may operate using a transmission mode (e.g., Mode 2) where resource selection and/or scheduling is performed by the UE 305 (e.g., rather than a base station 110). In some examples, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

Sidelink communication may include unicast communication, groupcast communication, and/or broadcast communication. For example, SCI 330 may be transmitted in a broadcast manner. Thus, any UE capable of sidelink communication may decode SCI 330 regardless of whether the UE is an intended recipient for SCI 330.

As indicated above, FIG. 3 is provided as an example. Other examples may differ from what is described with respect to FIG. 3.

Figure 4:
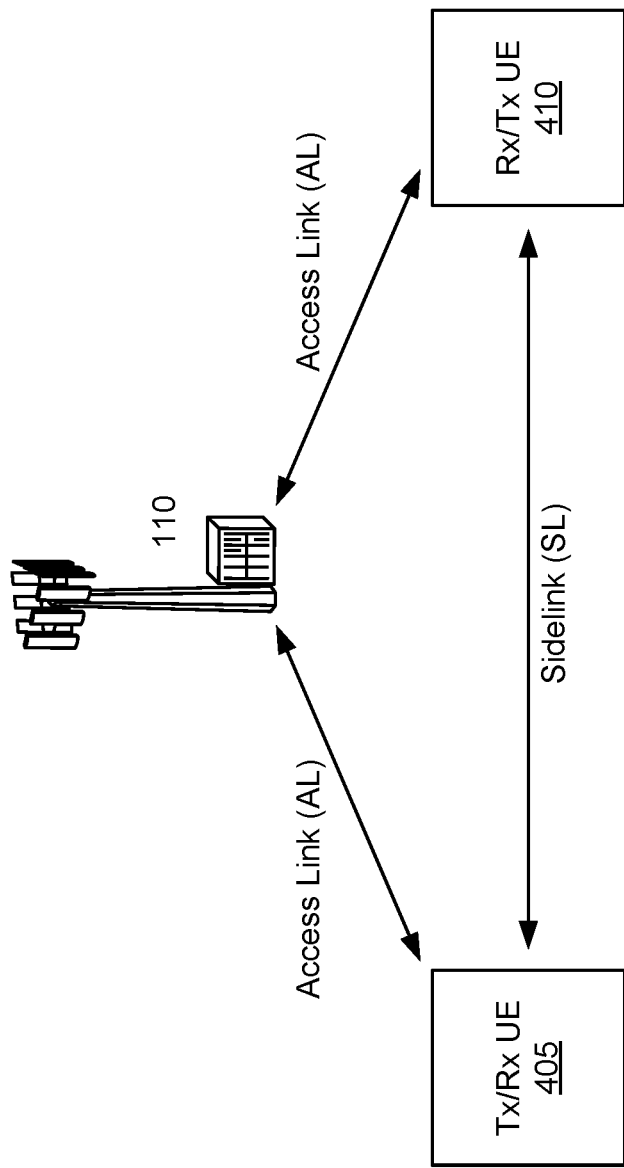
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

UEs may communicate using sidelink connectionless groupcast (e.g., in an RRC idle mode or an RRC connected mode). Here, a transmitter UE may form a virtual group with other UEs that are within a threshold distance of the transmitter UE. However, in connectionless groupcast, there is no RRC connection between the transmitter UE 305 and the other UEs of the virtual group. Thus, connectionless groupcast may be useful when the transmitter UE 305 (e.g., a vehicle UE) is mobile, and the information transmitted by the transmitter UE 305 (e.g., a collision warning, or the like) is intended only for other UEs (e.g., other vehicle UEs) that are near the transmitter UE 305. In connectionless groupcast, feedback for a transmission may be provided as only a negative acknowledgment (NACK) (e.g., acknowledgment (ACK) is assumed if a NACK is not transmitted), or feedback may be provided as an ACK or a NACK.

A resource for transmitting the feedback (e.g., NACK or ACK/NACK) may be based at least in part on a source identifier associated with the transmitter UE 305 (e.g., indicated in SCI-2) and a subchannel used for the transmission. The source identifier in SCI-2 may be unsecured (e.g., unencrypted), thereby enabling a malicious UE to determine the resource for transmitting feedback and to transmit spoofed feedback in the resource. However, UEs engaged in connectionless groupcast are not enabled to use RRC signaling to reach a security key agreement because there is no RRC connection between the UEs. Moreover, due to the mobility of the UEs, re-keying may need to be performed frequently to account for UEs moving toward or away from the transmitter UE 305.

Some techniques and apparatuses described herein provide security key management for sidelink connectionless groupcast communication. In some aspects, a transmitter UE may request a security key for connectionless groupcast from a node, such as a base station or an RSU, and the node may respond with information indicating the security key. Moreover, the node may provide the information indicating the security key to one or more receiver UEs that are within a threshold distance of the UE. In this way, the transmitter UE and the receiver UE(s) may use the security key for securely transmitting and receiving, respectively, a communication for connectionless groupcast.

Figure 5:
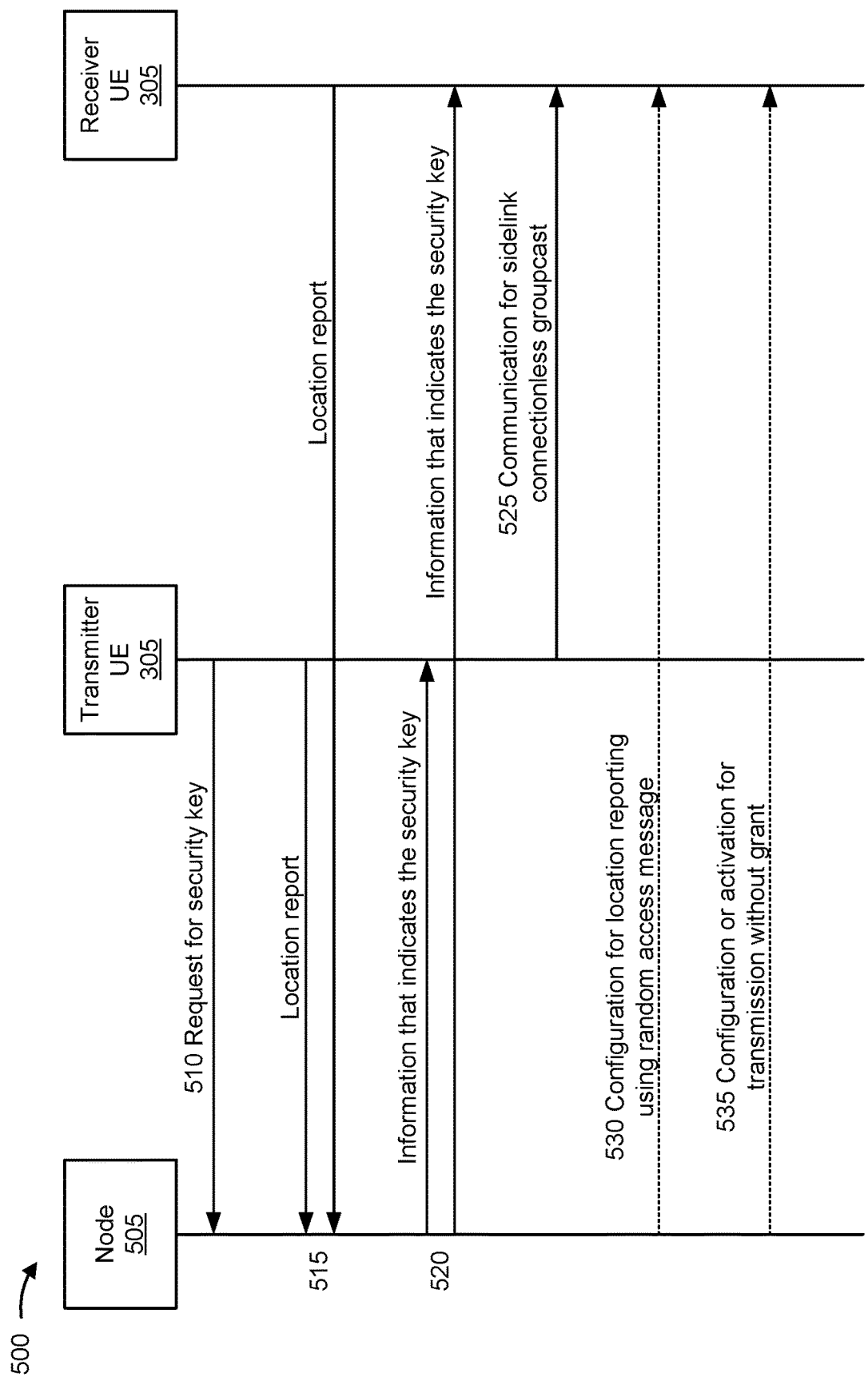
FIG. 5 is a diagram illustrating an example associated with sidelink connectionless groupcast communication using a security key, in accordance with the present disclosure.

FIG. 5 is a diagram illustrating an example 500 associated with sidelink connectionless groupcast communication using a security key, in accordance with the present disclosure. As shown in FIG. 5, a node 505, a transmitter UE 305, and a receiver UE 305 may communicate with one another. The node 505 (e.g., a wireless communication node, a network node, or the like) may correspond to one or more base stations described elsewhere herein, such as base station 110, or an RSU described herein. If the node 505 is an RSU, then a Uu signaling load may be offloaded to a PC5 interface, thereby conserving network resources. The transmitter UE 305 and/or the receiver UE 305 may correspond to one or more UEs described elsewhere herein, such as UE 120, UE 405, or UE 410. In some aspects, the transmitter UE 305 and/or the receiver UE 305 may be integrated into a vehicle and/or may be located in or on the vehicle. A vehicle may include an autonomous vehicle, a semi-autonomous vehicle, and/or a non-autonomous vehicle, among other examples.

The transmitter UE 305 and the receiver UE 305 may communicate via one or more sidelink channels 310 (e.g., to exchange SCI 330 and corresponding TBs 335), as described above in connection with FIG. 3. As used herein, "transmitter UE" is used to describe a UE that schedules transmission of a particular sidelink communication and transmits the particular sidelink communication to a receiver UE. As used herein, "receiver UE" is used to describe a UE that receives the particular sidelink communication from the transmitter UE. A single UE may be capable of operating as a transmitter UE (e.g., that transmits sidelink communications to other UEs) and a receiver UE (e.g., that receives sidelink communications from other UEs).

As shown by reference number 510, the transmitter UE 305 may transmit, and the node 505 may receive, a request for a security key for sidelink connectionless groupcast communication (e.g., that may be performed without an RRC connection between UEs 305). For example, the transmitter UE 305 may transmit the request if the transmitter UE 305 is to perform one or more transmissions for connectionless groupcast (e.g., the request indicates a willingness of the transmitter UE 305 to perform connectionless groupcast). Moreover, the transmitter UE 305 may transmit the request if the one or more transmissions for connectionless groupcast are to be secured (e.g., encrypted). For example, an application (e.g., a V2X application) of the transmitter UE 305 may indicate that transmissions in connection with the application are to be secured.

In some aspects, the request may indicate a distance from the transmitter UE 305 for using the security key. That is, the distance may define a communication range from the transmitter UE 305 in which secure connectionless groupcast communication is to be used (e.g., a communication range for which secure communication is to be enforced). In some aspects, the request may not indicate the distance, and a default distance may be assumed for the request.

As shown by reference number 515, the transmitter UE 305 may transmit, and the node 505 may receive, a report of a location of the transmitter UE 305. As also shown by reference number 515, the receiver UE 305 may transmit, and the node 505 may receive, a report indicating a location of the receiver UE 305. In addition, one or more additional receiver UEs 305 may transmit location reports to the node 505. A UE 305 may transmit a location report to the node 505 periodically (e.g., in accordance with a configuration for location reporting) or aperiodically. Moreover, a UE 305 may transmit a location report to the node 505 before and/or after the request from the transmitter UE 305 (e.g., the timing of the location reporting may be unrelated to the timing of the request).

As shown by reference number 520, the node 505 may transmit, and the transmitter UE 305 may receive, information that indicates the security key for sidelink connectionless groupcast communication (e.g., for a current connectionless groupcast session). As also shown by reference number 520, the receiver UE 305 may receive (e.g., a plurality of receiver UEs 305 may receive) the information that indicates the security key. The node 505 may transmit the information that indicates the security key to the receiver UE 305 if the receiver UE 305 is within a threshold distance of the transmitter UE 305 (e.g., if a distance between the transmitter UE 305 and the receiver UE 305 is less than or equal to the threshold distance). For example, the threshold distance may be the distance indicated in the request from the transmitter UE 305. In this way, security key distribution by the node 505 is to only a subset (e.g., a proper subset) of all possible receiver UEs 305 according to locations of the transmitter UE 305 and the receiver UEs 305.

In some aspects, the node 505 may determine whether the receiver UE 305 is within the threshold distance of the transmitter UE 305 using the report indicating the location of the receiver UE 305 and/or the report indicating the location of the transmitter UE 305. In some aspects, the node 505 may obtain, from a location management entity (e.g., a location management function server) of the network, location information for the transmitter UE 305 and/or the receiver UE 305. In some aspects, the node 505 may determine whether the receiver UE 305 is within the threshold distance of the transmitter UE 305 using the location information. In some aspects, the node 505 may verify the location reported by a UE 305 using the location information (e.g., to detect location spoofing and to ensure that the security key is only configured for the appropriate UEs). In some aspects, the node 505 may determine a location of a UE 305 using the location information and the reported location of the UE 305. For example, the node 505 may estimate the location of a UE 305 based at least in part on the location information for the UE 305 and the reported location of the UE 305 (e.g., the location may be estimated jointly based at least in part on a report indicating a location and location information from the location management entity).

In some aspects, the information that indicates the security key may be the security key ($K_g$). In other words, the node 505 may indicate the actual security key that is to be used in the current connectionless groupcast session. In some aspects, the information may be a parameter (p) used for deriving the security key. Here, the node 505 may configure all UEs 305 with a common security key ($K_{SL}$) upon attachment to the network, and the node 505 may configure the parameter used for deriving the security key to only the UEs 305 that are to be in the connectionless groupcast session (e.g., one or more receiver UEs 305 within the threshold distance of the transmitter UE 305). In some aspects, a UE 305 may derive the security key ($K_g$) based at least in part on the common security key ($K_{SL}$) and the parameter (p) using a derivation function (e.g., $K_g$=KDF ($K_{SL}$, p), where KDF is the derivation function). In some aspects, the node 505 may configure the derivation function for a UE 305. Thus, if a size of the security key is large relative to the parameter, indication of the parameter rather than the security key reduces signaling overhead, particularly if frequent re-keying is being performed (e.g., due to UE mobility).

As shown by reference number 525, the transmitter UE 305 may transmit, and the receiver UE 305 may receive (e.g., a plurality of receiver UEs 305 may receive), a communication (e.g., SCI, a TB, or the like) for sidelink connectionless groupcast using the security key. For example, the receiver UE 305 may receive the communication if the receiver UE 305 is within the threshold distance of the transmitter UE 305. In some aspects, the transmitter UE 305 may encode, and the receiver UE 305 may decode, the communication (e.g., a PSSCH) using the security key. In some aspects, the transmitter UE 305 may encode, and the receiver UE 305 may decode, information (e.g., a transmitter source identifier) of the communication using the security key.

As shown by reference number 530, the node 505 may transmit, and the receiver UE 305 may receive (e.g., a plurality of receiver UEs 305 may receive), a configuration indicating that a message of a random access procedure is to be used for location reporting. For example, the message of the random access procedure may be a message A (msgA) communication (e.g., a communication that combines a random access preamble and a random access payload, such as an RRC connection request) of a two-step random access procedure.

Based at least in part on the configuration, the receiver UE 305 may transmit, and the node 505 may receive, a random access preamble and location information as part of the random access message (e.g., the report of the location of the receiver UE 305 is in the message of the random access procedure). The node 505 may transmit the configuration to the receiver UE 305 if the receiver UE 305 is within the threshold distance of the transmitter UE 305 and/or if the receiver UE 305 is operating in an idle mode (e.g., an RRC idle mode) with the node 505 (e.g., and thus, the receiver UE 305 would need to periodically transition to an RRC connected mode for location reporting). In this way, the receiver UE 305 may use the random access message for location reporting without performing an exhaustive RRC connection establishment with the node 505 merely for location reporting. In some aspects, the transmitter UE 305 may receive, from the node, a configuration indicating that a message of a random access procedure is to be used for location reporting, as described herein.

As shown by reference number 535, the node 505 may transmit, and the receiver UE 305 may receive (e.g., a plurality of receiver UEs 305 may receive), a configuration or an activation for a transmission without grant that is to be used for location reporting. The transmission without grant may be a first type (referred to as type 1), in which an uplink data transmission without grant is based at least in part on RRC (re)configuration without any layer 1 (L1) signaling, or the transmission without grant may be a second type (referred to as type 2), in which an uplink data transmission without grant is based at least in part on both RRC configuration and L1 signaling for activation or deactivation of the transmission without grant.

Thus, based at least in part on the configuration and/or the activation, the receiver UE 305 may transmit location information in a resource for transmission without grant. The node 505 may transmit the configuration or the activation to the receiver UE 305 if the receiver UE 305 is within the threshold distance of the transmitter UE 305 and/or if the receiver UE 305 is operating in a connected mode (e.g., an RRC connected mode) with the node 505. For example, the node 505 may transmit the activation of transmission without grant when the receiver UE 305 is within the threshold distance of the transmitter UE 305 and/or the node 505 may transmit a deactivation of transmission without grant when the receiver UE 305 is beyond the threshold distance from the transmitter UE 305. In this way, performing transmission without grant reduces Uu signaling overhead in connection with location reporting. In some aspects, the transmitter UE 305 may receive, from the node, a configuration or an activation for a transmission without grant that is to be used for location reporting, as described herein.

In some aspects, the node 505 may transmit the configuration for location reporting using a random access message and/or the configuration or activation for transmission without grant to the receiver UE 305 or the transmitter UE 305 at any time after the request for the security key from the transmitter UE 505. For example, the node 505 may transmit the configuration for location reporting using a random access message and/or the configuration or activation for transmission without grant to the receiver UE 305 based at least in part on a determination that the receiver UE 305 is within the threshold distance of the transmitter UE 305. Use of a random access message and/or transmission without grant for location reporting facilitates location reporting with greater frequency and reduced signaling overhead.

In some aspects, the transmitter UE 305 may transmit, to the node 505, a new report of a location of the transmitter UE 305 and/or the receiver UE 305 may transmit, to the node 505, a new report of a location of the receiver UE 305. The transmitter UE 305 may transmit the new location report in a message of a random access procedure or in a resource for a transmission without grant and/or the receiver UE 305 may transmit the new location report in a message of a random access procedure or in a resource for a transmission without grant, as described herein. In some aspects, the new location report of the transmitter UE 305 and/or the new location report of the receiver UE 305 may indicate that the receiver UE 305 is no longer within the threshold distance of the transmitter UE 305 (e.g., due to movement of the transmitter UE 305 and/or the receiver UE 305). Here, the node 505 may transmit information that indicates a new security key (e.g., the information may be the actual new security key or a parameter for deriving the new security key) to one or more receiver UEs 305 that remain within the threshold distance of the transmitter UE 305 and/or one or more receiver UEs 305 that have entered the threshold distance of the transmitter UE 305. In this way, the security key may be refreshed as receiver UEs 305 leave or enter the secure communication range of the transmitter UE 305, thereby facilitating secure connectionless groupcast communication among only the UEs 305 that are within the secure communication range.

As indicated above, FIG. 5 is provided as an example. Other examples may differ from what is described with respect to FIG. 5.

Figure 6:
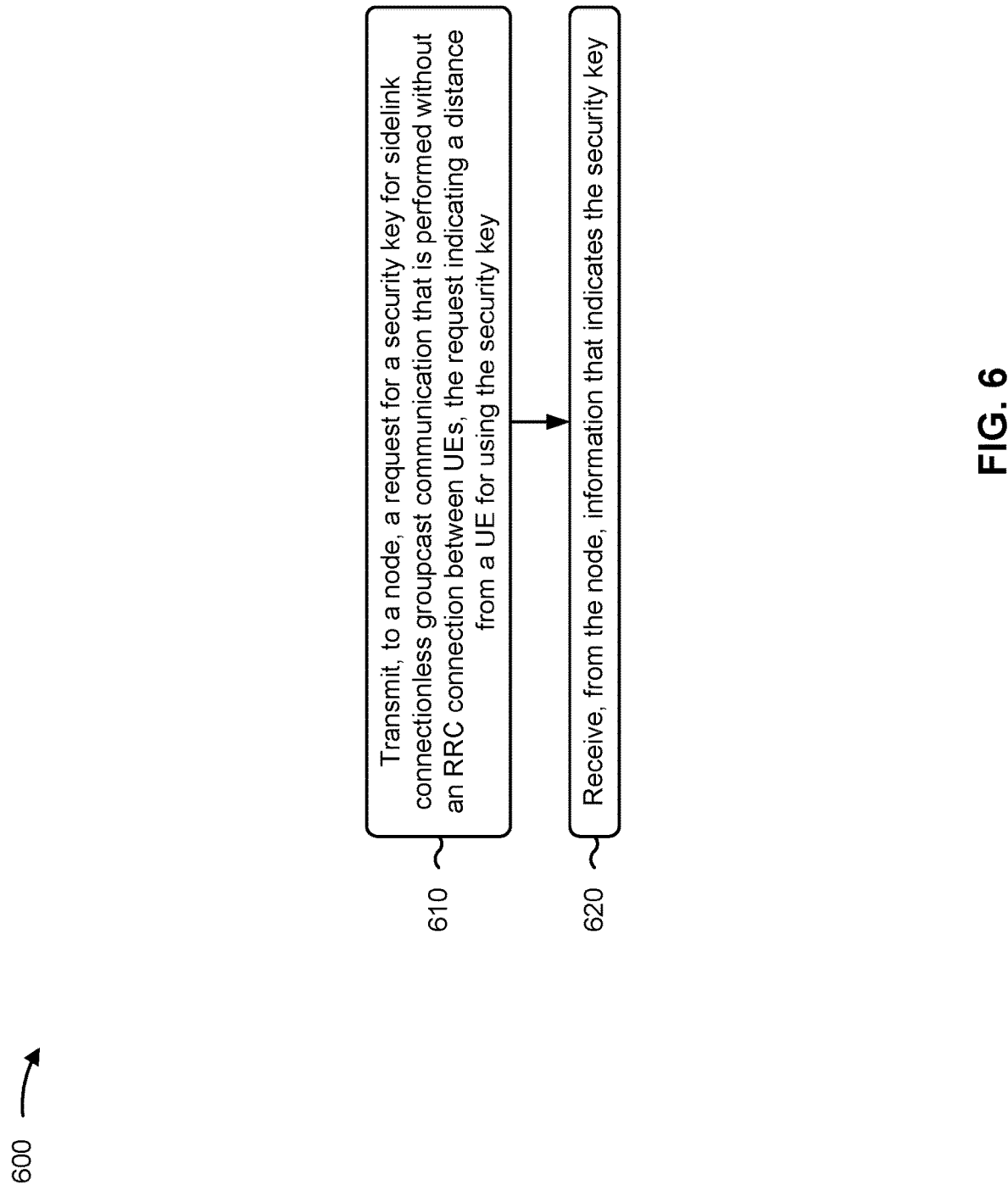
FIGS. 6-8 are diagrams illustrating example processes associated with sidelink connectionless groupcast communication using a security key, in accordance with the present disclosure.

FIG. 6 is a diagram illustrating an example process 600 performed, for example, by a UE, in accordance with the present disclosure. Example process 600 is an example where the UE (e.g., UE 120) performs operations associated with sidelink connectionless groupcast communication using a security key.

As shown in FIG. 6, in some aspects, process 600 may include transmitting, to a node, a request for a security key for sidelink connectionless groupcast communication that is performed without an RRC connection between UEs, the request indicating a distance from a UE for using the security key (block 610). For example, the UE (e.g., using communication manager 140 and/or transmission component 904, depicted in FIG. 9) may transmit, to a node, a request for a security key for sidelink connectionless groupcast communication that is performed without an RRC connection between UEs, the request indicating a distance from the UE for using the security key, as described above.

As further shown in FIG. 6, in some aspects, process 600 may include receiving, from the node, information that indicates the security key (block 620). For example, the UE (e.g., using communication manager 140 and/or reception component 902, depicted in FIG. 9) may receive, from the node, information that indicates the security key, as described above.

Process 600 may include additional aspects, such as any single aspect or any combination of aspects described below and/or in connection with one or more other processes described elsewhere herein.

Figure 9:
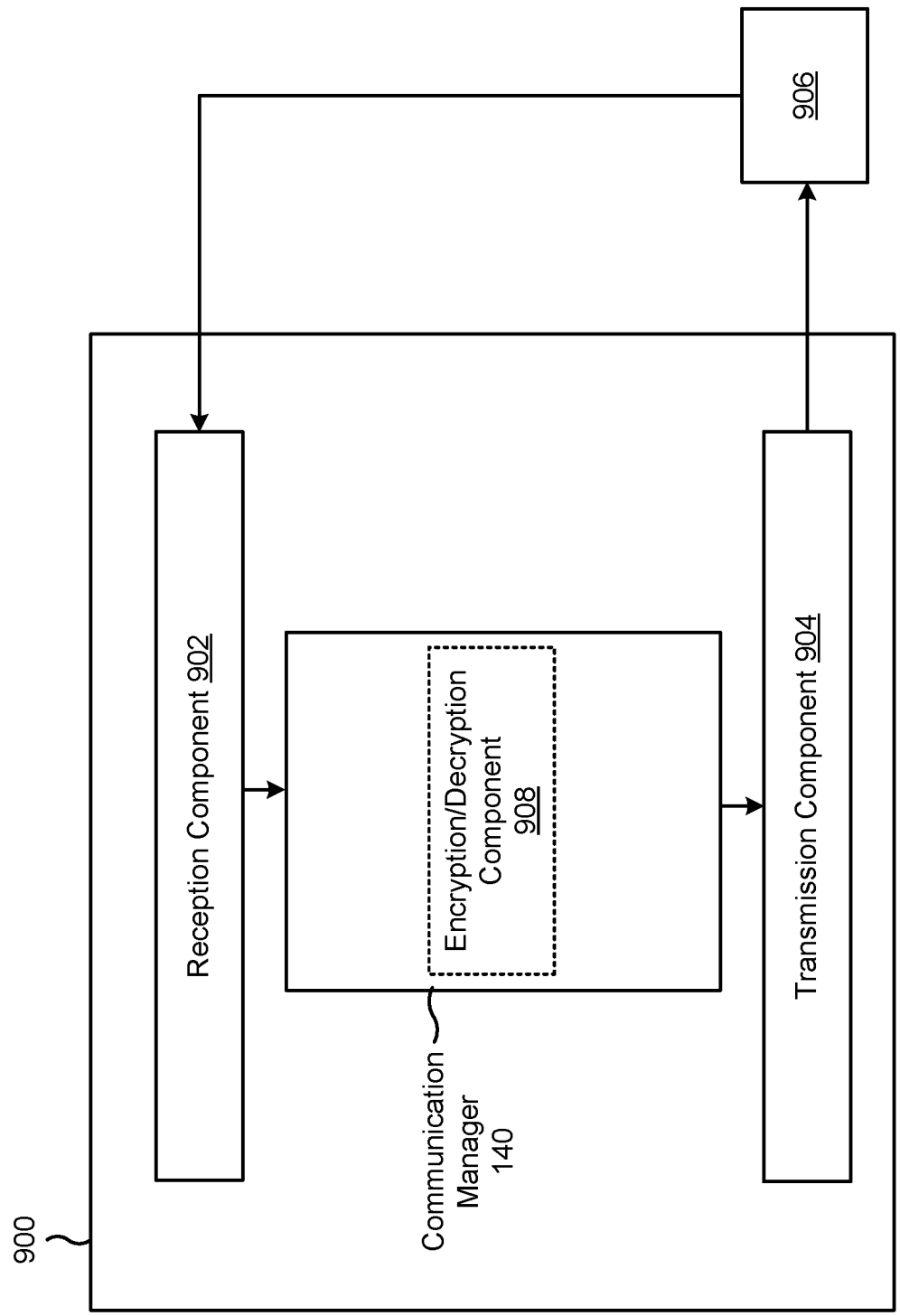
FIGS. 9-10 are diagrams of example apparatuses for wireless communication, in accordance with the present disclosure.

In a first aspect, process 600 includes transmitting (e.g., using communication manager 140 and/or transmission component 904, depicted in FIG. 9) a communication for sidelink connectionless groupcast using the security key.

In a second aspect, alone or in combination with the first aspect, the information is the security key.

In a third aspect, alone or in combination with one or more of the first and second aspects, the information is a parameter used for deriving the security key.

In a fourth aspect, alone or in combination with one or more of the first through third aspects, process 600 includes transmitting (e.g., using communication manager 140 and/or transmission component 904, depicted in FIG. 9), to the node, a report indicating a location of the UE.

In a fifth aspect, alone or in combination with one or more of the first through fourth aspects, the report is in a message for a random access procedure.

In a sixth aspect, alone or in combination with one or more of the first through fifth aspects, the report is transmitted in a resource for a transmission without grant.

In a seventh aspect, alone or in combination with one or more of the first through sixth aspects, process 600 includes receiving (e.g., using communication manager 140 and/or reception component 902, depicted in FIG. 9), from the node, a configuration indicating that a message of a random access procedure is to be used for location reporting.

In an eighth aspect, alone or in combination with one or more of the first through seventh aspects, process 600 includes receiving (e.g., using communication manager 140 and/or reception component 902, depicted in FIG. 9), from the node, a configuration or an activation for a transmission without grant that is to be used for location reporting.

In a ninth aspect, alone or in combination with one or more of the first through eighth aspects, the node is a base station or a roadside unit.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
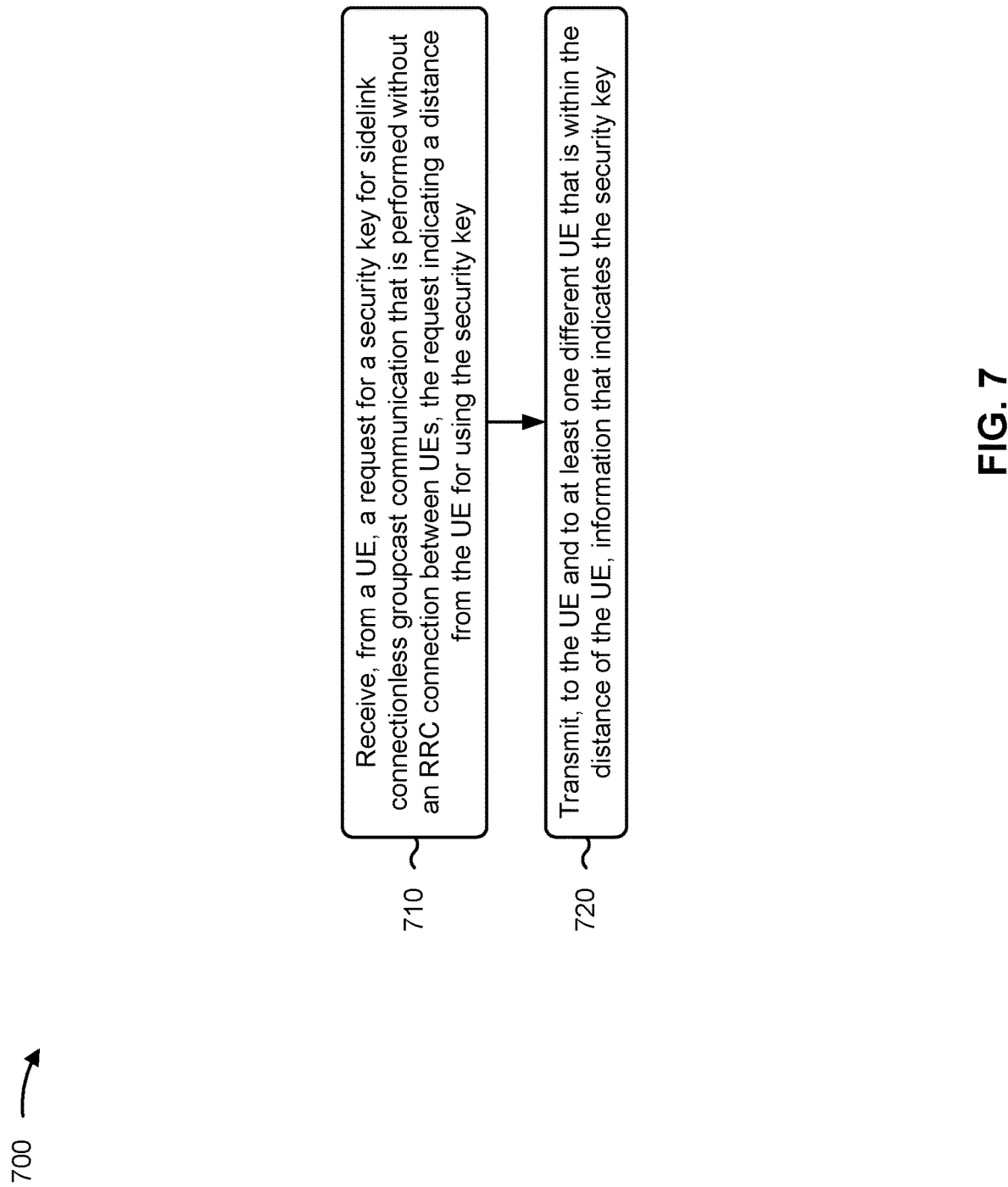

FIG. 7 is a diagram illustrating an example process 700 performed, for example, by a node, in accordance with the present disclosure. Example process 700 is an example where the node (e.g., base station 110, an RSU, or the like) performs operations associated with sidelink connectionless groupcast communication using a security key.

As shown in FIG. 7, in some aspects, process 700 may include receiving, from a UE, a request for a security key for sidelink connectionless groupcast communication that is performed without an RRC connection between UEs, the request indicating a distance from the UE for using the security key (block 710). For example, the node (e.g., using communication manager 150 and/or reception component 1002, depicted in FIG. 10) may receive, from a UE, a request for a security key for sidelink connectionless groupcast communication that is performed without an RRC connection between UEs, the request indicating a distance from the UE for using the security key, as described above.

As further shown in FIG. 7, in some aspects, process 700 may include transmitting, to the UE and to at least one different UE that is within the distance of the UE, information that indicates the security key (block 720). For example, the node (e.g., using communication manager 150 and/or transmission component 1004, depicted in FIG. 10) may transmit, to the UE and to at least one different UE that is within the distance of the UE, information that indicates the security key, as described above.

Process 700 may include additional aspects, such as any single aspect or any combination of aspects described below and/or in connection with one or more other processes described elsewhere herein.

In a first aspect, the information is the security key.

In a second aspect, alone or in combination with the first aspect, the information is a parameter used for deriving the security key.

Figure 10:
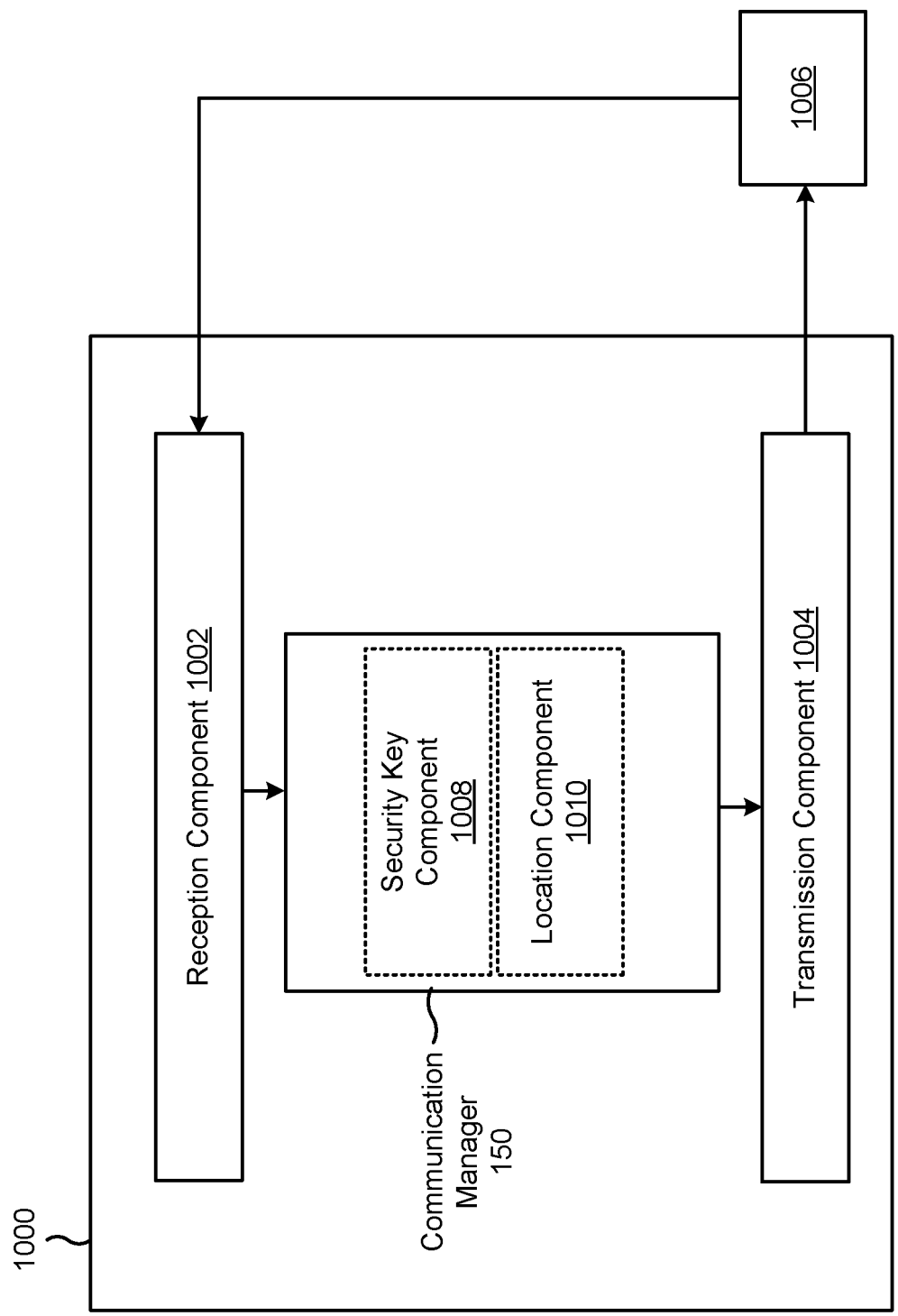

In a third aspect, alone or in combination with one or more of the first and second aspects, process 700 includes receiving (e.g., using communication manager 150 and/or reception component 1002, depicted in FIG. 10), from the UE, a first report indicating a location of the UE, and receiving (e.g., using communication manager 150 and/or reception component 1002, depicted in FIG. 10), from the at least one different UE, a second report indicating a location of the at least one different UE.

In a fourth aspect, alone or in combination with one or more of the first through third aspects, at least one of the first report or the second report is in a message of a random access procedure.

In a fifth aspect, alone or in combination with one or more of the first through fourth aspects, at least one of the first report or the second report is received in a resource for a transmission without grant.

In a sixth aspect, alone or in combination with one or more of the first through fifth aspects, process 700 includes transmitting (e.g., using communication manager 150 and/or transmission component 1004, depicted in FIG. 10), to the UE or to the at least one different UE, a configuration indicating that a message of a random access procedure is to be used for location reporting.

In a seventh aspect, alone or in combination with one or more of the first through sixth aspects, process 700 includes transmitting (e.g., using communication manager 150 and/or transmission component 1004, depicted in FIG. 10), to the UE or to the at least one different UE, a configuration or an activation for a transmission without grant that is to be used for location reporting.

In an eighth aspect, alone or in combination with one or more of the first through seventh aspects, process 700 includes obtaining (e.g., using communication manager 150 and/or location component 1010, depicted in FIG. 10), from a location management entity, location information for at least one of the UE or the at least one different UE.

In a ninth aspect, alone or in combination with one or more of the first through eighth aspects, process 700 includes verifying (e.g., using communication manager 150 and/or location component 1010, depicted in FIG. 10) a location reported by at least one of the UE or the at least one different UE using location information from a location management entity.

In a tenth aspect, alone or in combination with one or more of the first through ninth aspects, process 700 includes determining (e.g., using communication manager 150 and/or location component 1010, depicted in FIG. 10) a location of at least one of the UE or the at least one different UE using location information from a location management entity and a reported location.

In an eleventh aspect, alone or in combination with one or more of the first through tenth aspects, the node is a base station or a roadside unit.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
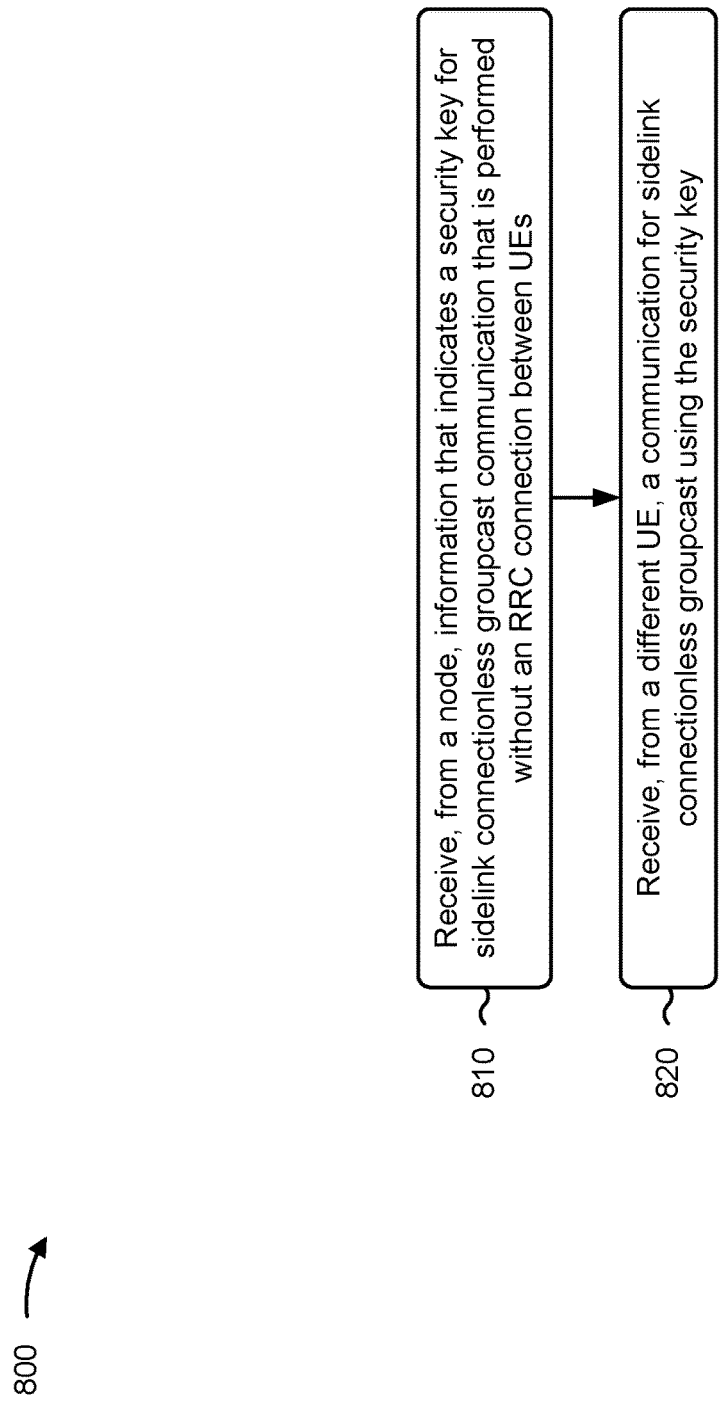

FIG. 8 is a diagram illustrating an example process 800 performed, for example, by a UE, in accordance with the present disclosure. Example process 800 is an example where the UE (e.g., UE 120) performs operations associated with sidelink connectionless groupcast communication using a security key.

As shown in FIG. 8, in some aspects, process 800 may include receiving, from a node, information that indicates a security key for sidelink connectionless groupcast communication that is performed without an RRC connection between UEs (block 810). For example, the UE (e.g., using communication manager 140 and/or reception component 902, depicted in FIG. 9) may receive, from a node, information that indicates a security key for sidelink connectionless groupcast communication that is performed without an RRC connection between UEs, as described above.

As further shown in FIG. 8, in some aspects, process 800 may include receiving, from a different UE, a communication for sidelink connectionless groupcast using the security key (block 820). For example, the UE (e.g., using communication manager 140 and/or reception component 902, depicted in FIG. 9) may receive, from a different UE, a communication for sidelink connectionless groupcast using the security key, as described above.

Process 800 may include additional aspects, such as any single aspect or any combination of aspects described below and/or in connection with one or more other processes described elsewhere herein.

In a first aspect, the information is received if the UE is within a distance, of the different UE, that is indicated by the different UE.

In a second aspect, alone or in combination with the first aspect, the information is the security key.

In a third aspect, alone or in combination with one or more of the first and second aspects, the information is a parameter used for deriving the security key.

In a fourth aspect, alone or in combination with one or more of the first through third aspects, process 800 includes transmitting (e.g., using communication manager 140 and/or transmission component 904, depicted in FIG. 9), to the node, a report of a location of the UE.

In a fifth aspect, alone or in combination with one or more of the first through fourth aspects, the report is in a message for a random access procedure.

In a sixth aspect, alone or in combination with one or more of the first through fifth aspects, the report is transmitted in a resource for a transmission without grant.

In a seventh aspect, alone or in combination with one or more of the first through sixth aspects, process 800 includes receiving (e.g., using communication manager 140 and/or reception component 902, depicted in FIG. 9), from the node, a configuration indicating that a message of a random access procedure is to be used for location reporting.

In an eighth aspect, alone or in combination with one or more of the first through seventh aspects, process 800 includes receiving (e.g., using communication manager 140 and/or reception component 902, depicted in FIG. 9), from the node, a configuration or an activation for a transmission without grant that is to be used for location reporting.

In a ninth aspect, alone or in combination with one or more of the first through eighth aspects, the node is a base station or a roadside unit.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include an encryption/decryption component 908, among other examples.

In some aspects, the apparatus 900 may be configured to perform one or more operations described herein in connection with FIG. 5. Additionally, or alternatively, the apparatus 900 may be configured to perform one or more processes described herein, such as process 600 of FIG. 6, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

In some aspects, the transmission component 904 may transmit, to a node, a request for a security key for sidelink connectionless groupcast communication that is performed without an RRC connection between UEs, the request indicating a distance from the apparatus 900 for using the security key. The reception component 902 may receive, from the node, information that indicates the security key.

The encryption/decryption component 908 may encode a communication for sidelink connectionless groupcast using the security key. The transmission component 904 may transmit a communication for sidelink connectionless groupcast using the security key. The transmission component 904 may transmit, to the node, a report indicating a location of the apparatus 900. The reception component 902 may receive, from the node, a configuration indicating that a message of a random access procedure is to be used for location reporting. The reception component 902 may receive, from the node, a configuration or an activation for a transmission without grant that is to be used for location reporting.

In some aspects, the reception component 902 may receive, from a node, information that indicates a security key for sidelink connectionless groupcast communication that is performed without an RRC connection between UEs. The reception component 902 may receive, from a different UE, a communication for sidelink connectionless groupcast using the security key. The encryption/decryption component 908 may decode a communication for sidelink connectionless groupcast using the security key.

The transmission component 904 may transmit, to the node, a report of a location of the UE. The reception component 902 may receive, from the node, a configuration indicating that a message of a random access procedure is to be used for location reporting. The reception component 902 may receive, from the node, a configuration or an activation for a transmission without grant that is to be used for location reporting.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a security key component 1008 or a location component 1010, among other examples.

In some aspects, the apparatus 1000 may be configured to perform one or more operations described herein in connection with FIG. 5. Additionally, or alternatively, the apparatus 1000 may be configured to perform one or more processes described herein, such as process 700 of FIG. 7, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive, from a UE, a request for a security key for sidelink connectionless groupcast communication that is performed without an RRC connection between UEs, the request indicating a distance from the UE for using the security key. The transmission component 1004 may transmit, to the UE and to at least one different UE that is within the distance of the UE, information that indicates the security key. The security key component 1008 may generate the information that indicates the security key.

The reception component 1002 may receive, from the UE, a first report indicating a location of the UE. The reception component 1002 may receive, from the at least one different UE, a second report indicating a location of the at least one different UE. The transmission component 1004 may transmit, to the UE or to the at least one different UE, a configuration indicating that a message of a random access procedure is to be used for location reporting. The transmission component 1004 may transmit, to the UE or to the at least one different UE, a configuration or an activation for a transmission without grant that is to be used for location reporting.

The location component 1010 may obtain, from a location management entity, location information for at least one of the UE or the at least one different UE. The location component 1010 may verify a location reported by at least one of the UE or the at least one different UE using location information from a location management entity. The location component 1010 may determine a location of at least one of the UE or the at least one different UE using location information from a location management entity and a reported location.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting, to a node, a request for a security key for sidelink connectionless groupcast communication that is performed without a radio resource control connection between UEs, the request indicating a distance from the UE for using the security key; and receiving, from the node, information that indicates the security key.

Aspect 2: The method of Aspect 1, further comprising: transmitting a communication for sidelink connectionless groupcast using the security key.

Aspect 3: The method of any of Aspects 1-2, wherein the information is the security key.

Aspect 4: The method of any of Aspects 1-2, wherein the information is a parameter used for deriving the security key.

Aspect 5: The method of any of Aspects 1-4, further comprising: transmitting, to the node, a report indicating a location of the UE.

Aspect 6: The method of Aspect 5, wherein the report is in a message for a random access procedure.

Aspect 7: The method of Aspect 5, wherein the report is transmitted in a resource for a transmission without grant.

Aspect 8: The method of any of Aspects 1-7, further comprising: receiving, from the node, a configuration indicating that a message of a random access procedure is to be used for location reporting.

Aspect 9: The method of any of Aspects 1-8, further comprising: receiving, from the node, a configuration or an activation for a transmission without grant that is to be used for location reporting.

Aspect 10: The method of any of Aspects 1-9, wherein the node is a base station or a roadside unit.

Aspect 11: A method of wireless communication performed by a node, comprising: receiving, from a user equipment (UE), a request for a security key for sidelink connectionless groupcast communication that is performed without a radio resource control connection between UEs, the request indicating a distance from the UE for using the security key; and transmitting, to the UE and to at least one different UE that is within the distance of the UE, information that indicates the security key.

Aspect 12: The method of Aspect 11, wherein the information is the security key.

Aspect 13: The method of Aspect 11, wherein the information is a parameter used for deriving the security key.

Aspect 14: The method of any of Aspects 11-13, further comprising: receiving, from the UE, a first report indicating a location of the UE; and receiving, from the at least one different UE, a second report indicating a location of the at least one different UE.

Aspect 15: The method of Aspect 14, wherein at least one of the first report or the second report is in a message of a random access procedure.

Aspect 16: The method of Aspect 14, wherein at least one of the first report or the second report is received in a resource for a transmission without grant.

Aspect 17: The method of any of Aspects 11-16, further comprising: transmitting, to the UE or to the at least one different UE, a configuration indicating that a message of a random access procedure is to be used for location reporting.

Aspect 18: The method of any of Aspects 11-17, further comprising: transmitting, to the UE or to the at least one different UE, a configuration or an activation for a transmission without grant that is to be used for location reporting.

Aspect 19: The method of any of Aspects 11-18, further comprising: obtaining, from a location management entity, location information for at least one of the UE or the at least one different UE.

Aspect 20: The method of any of Aspects 11-19, further comprising: verifying a location reported by at least one of the UE or the at least one different UE using location information from a location management entity.

Aspect 21: The method of any of Aspects 11-20, further comprising: determining a location of at least one of the UE or the at least one different UE using location information from a location management entity and a reported location.

Aspect 22: The method of any of Aspects 11-21, wherein the node is a base station or a roadside unit.

Aspect 23: A method of wireless communication performed by a user equipment (UE), comprising: receiving, from a node, information that indicates a security key for sidelink connectionless groupcast communication that is performed without a radio resource control connection between UEs; and receiving, from a different UE, a communication for sidelink connectionless groupcast using the security key.

Aspect 24: The method of Aspect 23, wherein the information is received if the UE is within a distance, of the different UE, that is indicated by the different UE.

Aspect 25: The method of any of Aspects 23-24, wherein the information is the security key.

Aspect 26: The method of any of Aspects 23-24, wherein the information is a parameter used for deriving the security key.

Aspect 27: The method of any of Aspects 23-26, further comprising: transmitting, to the node, a report of a location of the UE.

Aspect 28: The method of Aspect 27, wherein the report is in a message for a random access procedure.

Aspect 29: The method of Aspect 27, wherein the report is transmitted in a resource for a transmission without grant.

Aspect 30: The method of any of Aspects 23-29, further comprising: receiving, from the node, a configuration indicating that a message of a random access procedure is to be used for location reporting.

Aspect 31: The method of any of Aspects 23-30, further comprising: receiving, from the node, a configuration or an activation for a transmission without grant that is to be used for location reporting.

Aspect 32: The method of any of Aspects 23-31, wherein the node is a base station or a roadside unit.

Aspect 33: An apparatus for wireless communication at a device, comprising a processor; memory coupled with the processor; and instructions stored in the memory and executable by the processor to cause the apparatus to perform the method of one or more of Aspects 1-10.

Aspect 34: A device for wireless communication, comprising a memory and one or more processors coupled to the memory, the one or more processors configured to perform the method of one or more of Aspects 1-10.

Aspect 35: An apparatus for wireless communication, comprising at least one means for performing the method of one or more of Aspects 1-10.

Aspect 36: A non-transitory computer-readable medium storing code for wireless communication, the code comprising instructions executable by a processor to perform the method of one or more of Aspects 1-10.

Aspect 37: A non-transitory computer-readable medium storing a set of instructions for wireless communication, the set of instructions comprising one or more instructions that, when executed by one or more processors of a device, cause the device to perform the method of one or more of Aspects 1-10.

Aspect 38: An apparatus for wireless communication at a device, comprising a processor; memory coupled with the processor; and instructions stored in the memory and executable by the processor to cause the apparatus to perform the method of one or more of Aspects 11-22.

Aspect 39: A device for wireless communication, comprising a memory and one or more processors coupled to the memory, the one or more processors configured to perform the method of one or more of Aspects 11-22.

Aspect 40: An apparatus for wireless communication, comprising at least one means for performing the method of one or more of Aspects 11-22.

Aspect 41: A non-transitory computer-readable medium storing code for wireless communication, the code comprising instructions executable by a processor to perform the method of one or more of Aspects 11-22.

Aspect 42: A non-transitory computer-readable medium storing a set of instructions for wireless communication, the set of instructions comprising one or more instructions that, when executed by one or more processors of a device, cause the device to perform the method of one or more of Aspects 11-22.

Aspect 43: An apparatus for wireless communication at a device, comprising a processor; memory coupled with the processor; and instructions stored in the memory and executable by the processor to cause the apparatus to perform the method of one or more of Aspects 23-32.

Aspect 44: A device for wireless communication, comprising a memory and one or more processors coupled to the memory, the one or more processors configured to perform the method of one or more of Aspects 23-32.

Aspect 45: An apparatus for wireless communication, comprising at least one means for performing the method of one or more of Aspects 23-32.

Aspect 46: A non-transitory computer-readable medium storing code for wireless communication, the code comprising instructions executable by a processor to perform the method of one or more of Aspects 23-32.

Aspect 47: A non-transitory computer-readable medium storing a set of instructions for wireless communication, the set of instructions comprising one or more instructions that, when executed by one or more processors of a device, cause the device to perform the method of one or more of Aspects 23-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
transmitting, to a node, a request for a security key for sidelink connectionless groupcast communication, wherein the sidelink connectionless groupcast communication is performed without a radio resource control (RRC) connection between UEs, the request indicating a distance from the UE, to one or more other UEs, for using the security key; and
receiving, from the node, information that indicates the security key, wherein the information comprises a common security key and a parameter for deriving the security key from the common security key.

2. The method of claim 1, further comprising:
transmitting a communication for sidelink connectionless groupcast using the security key.

3. The method of claim 1, further comprising:
transmitting, to the node, a report indicating a location of the UE.

4. The method of claim 3, wherein the report is in a message for a random access procedure or the report is transmitted in a resource for a transmission without grant.

5. The method of claim 3, further comprising:
transmitting, to the node, a second report indicating a second location of the UE.

6. The method of claim 5, further comprising:
receiving, from the node, information that indicates a second parameter for deriving a second security key from the common security key.

7. The method of claim 1, further comprising:
receiving, from the node, a configuration indicating that a message of a random access procedure is to be used for location reporting.

8. The method of claim 1, further comprising:
receiving, from the node, a configuration or an activation for a transmission without grant that is to be used for location reporting.

9. A method of wireless communication performed by a node, comprising:
receiving, from a user equipment (UE), a request for a security key for sidelink connectionless groupcast communication, wherein the sidelink connectionless groupcast communication is performed without a radio resource control connection between UEs, the request indicating a distance from the UE, to one or more other UEs, for using the security key; and
transmitting, to the UE and to at least one different UE that is within the distance of the UE, information that indicates the security key, wherein the information comprises a common security key and a parameter for deriving the security key from the common security key.

10. The method of claim 9, further comprising:
receiving, from the UE, a first report indicating a location of the UE; and
receiving, from the at least one different UE, a second report indicating a location of the at least one different UE.

11. The method of claim 10, wherein at least one of the first report or the second report is in a message of a random access procedure or at least one of the first report or the second report is received in a resource for a transmission without grant.

12. The method of claim 9, further comprising:
transmitting, to the UE or to the at least one different UE, a configuration indicating that a message of a random access procedure is to be used for location reporting.

13. The method of claim 9, further comprising:
transmitting, to the UE or to the at least one different UE, a configuration or an activation for a transmission without grant that is to be used for location reporting.

14. The method of claim 9, further comprising:
verifying a location reported by at least one of the UE or the at least one different UE using location information from a location management entity.

15. The method of claim 9, further comprising:
determining a location of at least one of the UE or the at least one different UE using location information from a location management entity and a reported location.

16. The method of claim 9, further comprising:
receiving, from the UE, a third report indicating a second location of the UE.

17. The method of claim 16, further comprising:
transmitting, to the UE, information that indicates a second parameter for deriving a second security key from the common security key.

18. A method of wireless communication performed by a user equipment (UE), comprising:
receiving, from a node, information that indicates a security key for sidelink connectionless groupcast communication, wherein the information comprises a common security key and a parameter for deriving the security key from the common security key, wherein the sidelink connectionless groupcast communication is performed without a radio resource control connection between UEs, wherein the information is received if the UE is within a distance, of a different UE, that is indicated by the different UE; and
receiving, from the different UE, a communication for sidelink connectionless groupcast using the security key.

19. The method of claim 18, further comprising:
transmitting, to the node, a report of a location of the UE.

20. The method of claim 19, wherein the report is in a message for a random access procedure or the report is transmitted in a resource for a transmission without grant.

21. The method of claim 19, further comprising:
transmitting, to the node, a second report indicating a second location of the UE.

22. The method of claim 21, further comprising:
receiving, from the node, information that indicates a second parameter for deriving a second security key from the common security key.

23. The method of claim 18, further comprising:
receiving, from the node, a configuration indicating that a message of a random access procedure is to be used for location reporting.

24. The method of claim 18, further comprising:
receiving, from the node, a configuration or an activation for a transmission without grant that is to be used for location reporting.

25. An apparatus for wireless communication at a user equipment (UE), comprising:
one or more memories; and
one or more processors, coupled to the one or more memories, configured to:
transmit, to a node, a request for a security key for sidelink connectionless groupcast communication, wherein the sidelink connectionless groupcast communication is performed without a radio resource control connection between UEs, the request indicating a distance from the UE, to one or more other UEs for using the security key; and
receive, from the node, information that indicates the security key, wherein the information comprises a common security key and a parameter for deriving the security key from the common security key.

26. The apparatus of claim 25, wherein the one or more processors are further configured to:
transmit, to the node, a report indicating a location of the UE.

27. The apparatus of claim 26, wherein the report is in a message for a random access procedure or the report is transmitted in a resource for a transmission without grant.

28. The apparatus of claim 26, wherein the one or more processors are further configured to:
transmit, to the node, a second report indicating a second location of the UE.

29. The apparatus of claim 28, wherein the one or more processors are further configured to:
receive, from the node, information that indicates a second parameter for deriving a second security key from the common security key.

30. The apparatus of claim 25, wherein the one or more processors are further configured to:
receive, from the node, a configuration indicating that a message of a random access procedure is to be used for location reporting.

\* \* \* \* \*